March 3, 1931. G. A. HUGHES ET AL 1,794,406
WELDING MACHINE
Filed Sept. 16, 1927   2 Sheets-Sheet 1
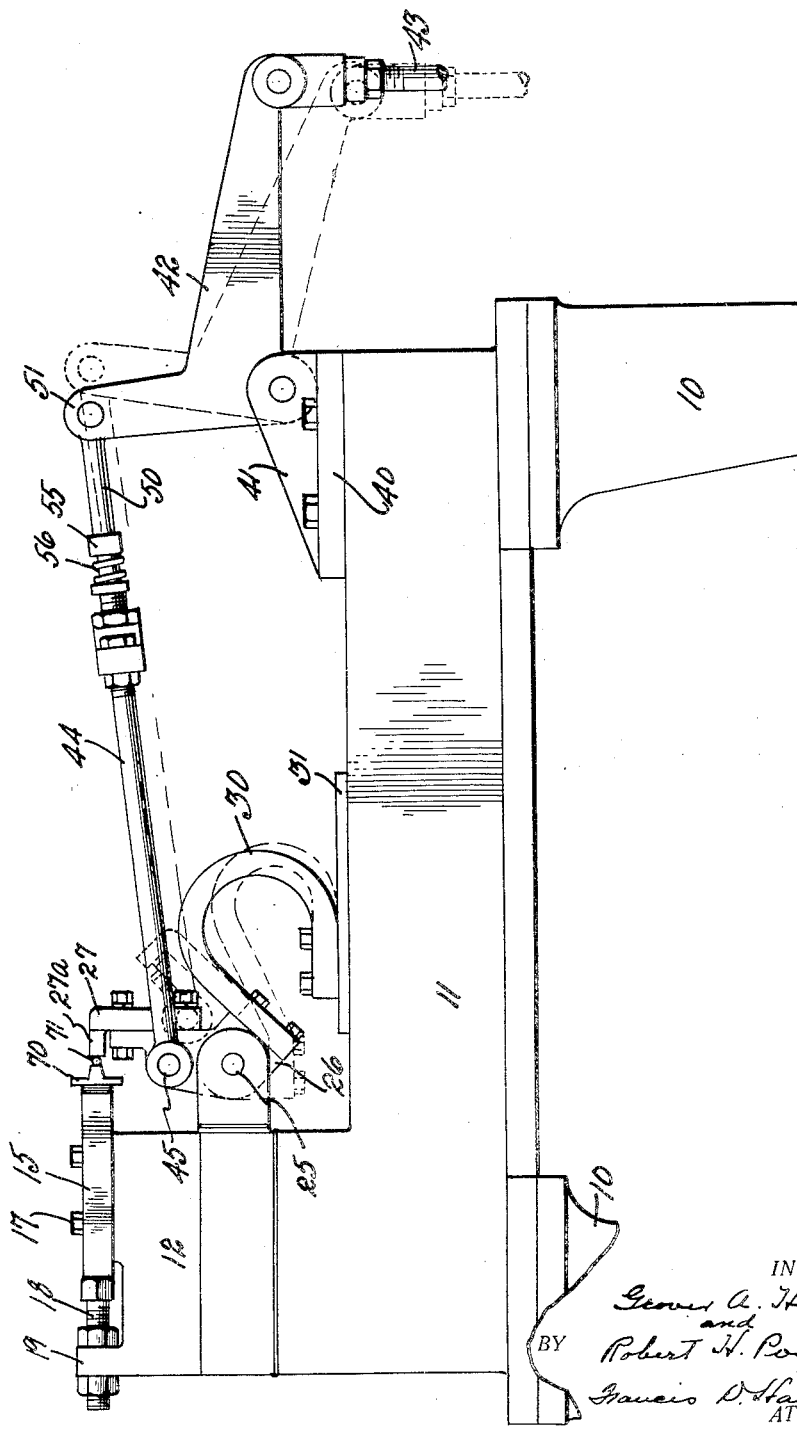

March 3, 1931.  G. A. HUGHES ET AL  1,794,406
WELDING MACHINE
Filed Sept. 16, 1927  2 Sheets-Sheet 2
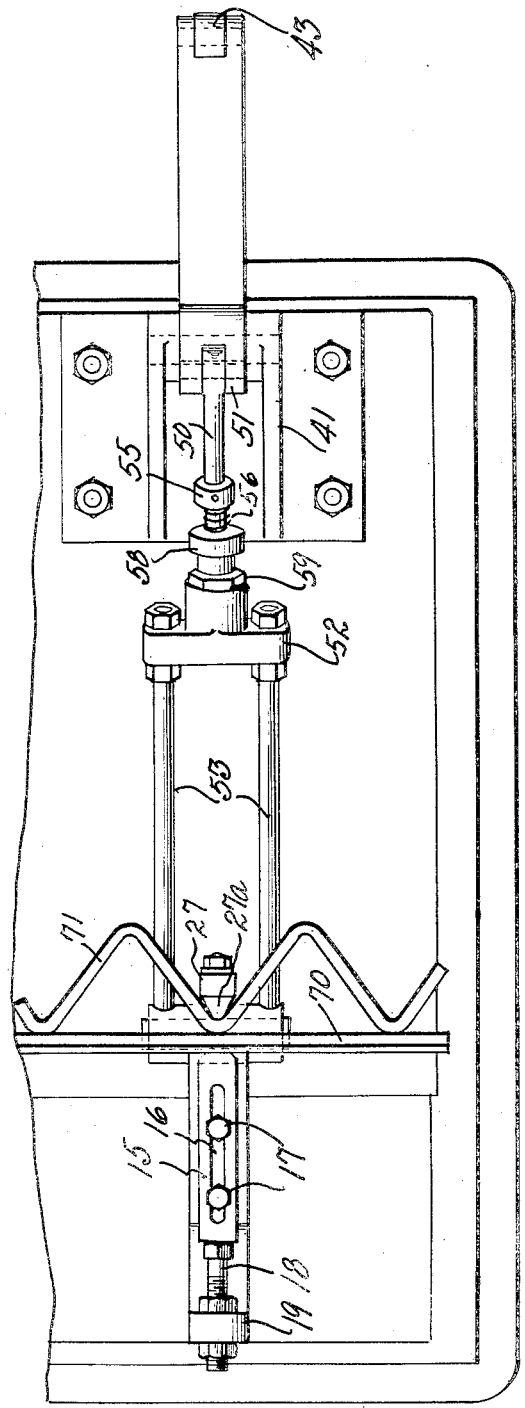
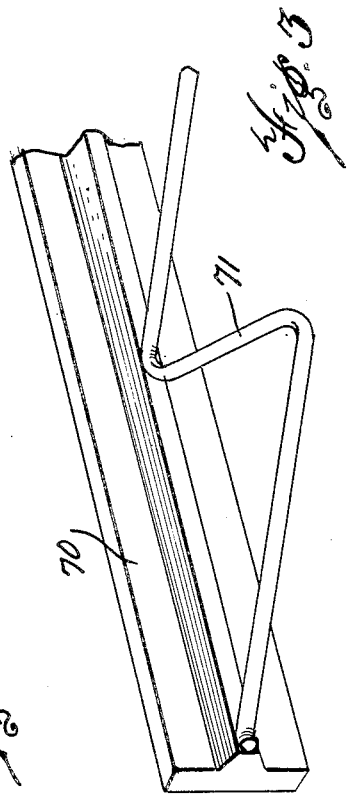
INVENTORS
Grover A. Hughes
and
Robert H. Pool
BY
Francis D. Hardesty
ATTORNEY.

Patented Mar. 3, 1931

1,794,406

UNITED STATES PATENT OFFICE

GROVER A. HUGHES AND ROBERT H. POOL, OF YOUNGSTOWN, OHIO, ASSIGNORS TO TRUSCON STEEL COMPANY, OF YOUNGSTOWN, OHIO, A CORPORATION OF OHIO

WELDING MACHINE

Application filed September 16, 1927. Serial No. 220,036.

The present invention relates to welding machines of the type wherein an electric current is passed through the parts to be welded and the welding temperature attained through the resistance of the parts, and particularly to welding machines for making steel units.

Among the objects of the invention is a machine in which the movable electrode may be easily and quickly moved from the path traveled by the parts to be welded and therefore not interfere with the indexing of the work.

Other objects will readily appear to those skilled in the art upon reference to the following description and accompanying drawings in which:—

Fig. 1 is a side elevation of the machine;
Fig. 2 is a plan view thereof; and
Fig. 3 is a perspective view of a structural unit produced by the machine.

As shown, the machine comprises a suitable base, such as legs 10, supporting a bed member 11 upon which, at one end, is an upright portion 12 furnishing support for one of the welding electrodes 15, which is preferably adjustably fixed thereto, as indicated by the slot 16 and screws 17 and the set screw 18 passing through a suitable lug 19.

Also supported by upright 12 is a rod 25 which supports a broad faced bell crank 26 upon the lower edge of which is disposed the broad L-shaped electrode 27. The latter will be bolted to bell crank or carrier 26 and is suitably insulated therefrom and current will be supplied thereto by means of a flexible lead 30. The other end of lead 30 will be secured to the bed 11 but insulated therefrom by means of an insulating block 31. It is of course understood that lead 30 will be connected in a proper manner to a source of electric current.

At the opposite end of bed 11 from upright 12, will be secured a plate 40 having ears 41 between which will be pivoted a bell-crank 42 to one arm of which is secured an operating link 43. The other arm of crank 42 is connected through link 44 to the electrode carrier 26 to which the link is hinged as at 45. It is preferred to make the link 44, as shown best in Figs. 1 and 2, of an eye bolt 50, hinged to crank 42 at 51, a yoke 52 and two blots or rods 53 connecting the ends of yoke 52 with the hinge pin on carrier 26. The bolt 50 will preferably pass loosely through yoke 52 with a suitable stop at its lower end and will carry a collar 55 between which and the yoke will be provided a compression spring 56 so that when the bell-crank 42 is operated to cause the carrier to rock to its upper position, yielding pressure will be exerted on the work by the electrode 27.

It is preferred also to provide an adjustment at the yoke and this is done by passing the bolt 50 through an externally threaded nipple 58 screwed into yoke 52 and provided with a lock-nut 59. Nipple 58 also serves as one abutment for spring 56.

The particular machine shown in the drawings is for the purpose of welding to a bar a zigzag rod forming the web of a structural beam, in effect an I-beam or one of T-section, and for this reason the nose 27a of electrode 27 is V-shaped in form as shown best in Fig. 2.

In operating the machine, a bar 70, preferably itself of T-section, is supported in front of and against the electrode 15 with the rod 71 in contact therewith at the apex or apices of its bends, as shown in Fig. 2. Suitable supports (not shown) will, of course, be provided upon either side of the welding position.

In moving the work into position for welding, the electrode 27 and carrier 26 will be in the position shown in dotted lines in Fig. 1 and therefore out of the way.

After the work is in position the rod 43 will be operated by any suitable means, such as a pedal, to lift the electrode to the full line position and press it tightly against the two parts 70 and 71, whereupon the current is supplied to cause the welding.

It is of course, obvious that a second bar 70 may be welded to the opposite apices of rod 71 to form an I-beam and this may be done either in the same machine as a second operation or a second machine oppositely placed may receive the work coming from the first and the second bar 70 added therein.

Now having described the invention and the preferred form of embodiment thereof it is to be understood that the said invention is to be limited, not to the specific details herein set forth and illustrated but only, by the scope of the claims which follow.

We claim:—

1. A welding machine including a horizontal fixed electrode against which work is adapted to be supported, a movable electrode adapted to be pressed laterally against the work, said latter electrode being secured to a hinged carrier and means for swinging said carrier and electrode from welding position to an inoperative position out of the path of movement of the work and below the horizontal plane thereof.

2. In a welding machine, a bed member having at one end an upright portion providing support for an electrode, an electrode secured thereto longitudinally of the bed member, a carrier hinged to the upright portion below the horizontal plane of said electrode, and adapted to rock in the vertical plane of the said electrode, a second electrode secured to the carrier, and means carried by the bed member for rocking said carrier to cause the electrodes to approach each other and to exert yielding pressure on the second electrode.

3. A welding machine for welding webs to longitudinal bars for the production of structural elements, said machine comprising an electrode positioned in the plane of the work, a second electrode, and a hinge support for the latter enabling it to be moved from below into the said plane to welding position and downwardly out of said plane to permit indexing of the work.

GROVER A. HUGHES.
ROBERT H. POOL.